US011218698B2

(12) United States Patent
Aflaki Beni et al.

(10) Patent No.: US 11,218,698 B2
(45) Date of Patent: Jan. 4, 2022

(54) FRACTIONAL/ARBITRARY TILE GROUPING

(71) Applicant: Nokia Technologies Oy, Espoo (FI)

(72) Inventors: Payman Aflaki Beni, Tampere (FI); Sebastian Schwarz, Unterhaching (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/032,049

(22) Filed: Sep. 25, 2020

(65) Prior Publication Data

US 2021/0099703 A1 Apr. 1, 2021

Related U.S. Application Data

(60) Provisional application No. 62/907,129, filed on Sep. 27, 2019.

(51) Int. Cl.
*H04N 19/119* (2014.01)
*G06K 9/00* (2006.01)
*G06T 9/00* (2006.01)
*H04N 19/167* (2014.01)
(Continued)

(52) U.S. Cl.
CPC ....... *H04N 19/119* (2014.11); *G06K 9/00765* (2013.01); *G06T 9/00* (2013.01); *H04N 19/167* (2014.11); *H04N 19/172* (2014.11); *H04N 19/70* (2014.11)

(58) Field of Classification Search
CPC ............................ H04N 19/119; H04N 19/167
See application file for complete search history.

(56) References Cited

U.S. PATENT DOCUMENTS

| | | |
|---|---|---|
| 2014/0301464 A1 | 10/2014 | Wu et al. |
| 2020/0221139 A1* | 7/2020 | Vosoughi ............. H04N 19/119 |
| 2020/0252605 A1* | 8/2020 | Xu ........................ H04N 19/105 |

(Continued)

OTHER PUBLICATIONS

Vosoughi, A. et al. [V-PCC] [CE2.19 Report] Content-aware PCC supporting spatial random-access and parallel encoding/decoding, MPEG document m47804. MPEG Document Management System, 126th meeting: Geneva [online], Mar. 26, 2019, [retrieved on Mar. 18, 2021]. Retrieved from <http://dms.mpeg.expert/> sections 1-3, 7; Figs. 1-2, 7.

(Continued)

*Primary Examiner* — Jerry T Jean Baptiste
(74) *Attorney, Agent, or Firm* — Harrington & Smith

(57) ABSTRACT

Apparatuses, methods, and computer programs are disclosed for fractional/arbitrary tile grouping. An example apparatus includes circuitry configured to receive a video presentation frame, wherein the video presentation frame represents three-dimensional data; divide the video presentation frame into a plurality of tiles, wherein one or more of the plurality of tiles may be a fractional tile, as part of a process of encoding the video presentation frame, wherein each tile represents a part of the three-dimensional data of the video presentation frame; group the tiles into one or more groups, wherein individual tiles of the video presentation frame have a capability of not belonging to any of the one or more groups; in response to fractional tiling being present, transmit a signal of fractional tiling related syntax or semantics; and provide an encoded video presentation frame to a decoder, the encoded video presentation frame comprising the grouping of the tiles.

20 Claims, 15 Drawing Sheets

(51) Int. Cl.
*H04N 19/70* (2014.01)
*H04N 19/172* (2014.01)

(56) References Cited

U.S. PATENT DOCUMENTS

2021/0120275 A1* 4/2021 Misra .................... H04N 19/96
2021/0127136 A1* 4/2021 Han .......................... G06T 9/40

OTHER PUBLICATIONS

Continous improvement of Study Text of ISO/IEC CD 23090-5 Videobased Point Cloud Compression, MPEG document n18479. MPEG Document Management System, 126th meeting: Geneva [online], May 8, 2019, [retrieved on Mar. 23, 2021], Retrieved from <http://dms.mpeg.expert/> sections 6.2, 8,1; Fig. 6-1.

Wang, Y.-K. et al. AHG12: Flexible tiling, JVET document JVET-N0111.JVET Document Management System, 14th Meeting: Geneva [online],Mar. 12, 2019, [retrieved on Mar. 18, 2021]. Retrieved from <http://jvetexperts.org/> sections 1-2; Fig. 3.

Tourapis, A. M. et al. [V-PCC][New proposal] Volumetric Tiling Information SEI message for V-PCC, MPEG document m49414. MPEG Document Management System, 127th meeting: Gothenburg [online], Jul. 3, 2019, [retrieved on Mar. 18, 2021]. Retrieved from <http://dms.mpeg.expert/> sections 1-2; Fig. 1.

\* cited by examiner

The variables TopLeftTileColumn[i], TopLeftTileRow[i], BottomRightTileColumn[i], and BottomRightTileRow[i], which specify the corresponding tile column and row positions for the top left an bottom right tiles in a tile group are computed as follows:

TopLeftTileColumn[i] = pfti_top_left_tile_idx[i]
  % (pfti_num_tile_rows_minus1+1)
TopLeftTileRow[i] = pfti_top_left_tile_idx[i]
  % (pfti_num_tile_rows_minus1+1)
botRightTileIdx = pfti_top_left_tile_idx[i]
  + pfti_bottom_right_tile_idx_delta[i]
BottomRightTileColumn[i] = botRightTileIdx
  % (pfti_num_tile_rows_minus1+1)
BottomRightTileRow[i]] = botRightTileIdx
  / (pfti_num_tile_rows_minus1+1)

The variables NumTilesInTileGroups[i] and TilesToTileGroupMap[j], which specify the number of tiles in the i-th tile group and the mapping of tiles to tile groups, are derived as follows:

```
NumTilesInTileGroups[i] = 0
for(j = 0; j < NumTilesInPatchFrame; j++) {
        if(v >= TileColBd[pfti_top_left_tile_idx[i]] &&
                TileColBd[j] <= TileColBd[botRightTileIdx] &&
                TileRowBd[j] >= TileRowBd[pfti_top_left_tile_idx[i]] &&
                TileRowBd[j] <= TileRowBd[botRightTileIdx]) {
            NumTilesInTileGroups[i]++
            TilesToTileGroupMap[j] = i
        }
}
```
(7-35)

The variables TileGroupWidth[i] and TileGroupHeight[i], which specify the width and height of a tile group respectively, are then computed as follows:

```
TileGroupWidth[i] = 0
TileGroupHeight[i] = 0
for (j = TopLeftTileColumn[i]; j <= BottomRightTileColumn[i]; j++) {
        TileGroupWidth[i] += ColWidth[j] * 64
}
for (j = TopLeftTileRow[i]; j <= BottomRightTileRow[i]; j++) {
        TileGroupHeight[i] += ColHeight[j] * 64
}
```

FIG.7

If present, the variables TopTileColumnFraction[i], LeftTileRowFraction[i], BottomTileColumnFraction[i], and RightTileRowFraction[i], which specify the corresponding tile column and row fractions added to the positions defined by TopLeftTileColumn[i], TopLeftTileRow[i], BottomRightTileColumn[i], and BottomRightTileRow[i]. Positions for the top left and bottom right corner of a tile group are computed as follows:

TopLeftTileColumn[i] = pfti_top_left_tile_idx[i] − TopTileColumnFraction[i]
         *pfti_top_left_tile_idx[i−1]

TopLeftTileRow[i] = pfti_top_left_tile_idx[i] − LeftTileRowFraction[i]
         *pfti_top_left_tile_idx[i−1]

botRightTileIdx = pfti_top_left_tile_idx[i]
         + pfti_bottom_right_tile_idx_delta[i]

BottomRightTileColumn[i] = botRightTileIdx[i] + BottomTileColumnFraction[i]
         *botRightTileIdx[i]

BottomRightTileRow[i] = botRightTileIdx[i] + RightTileRowFraction[i]
         *botRightTileIdx[i]

The variables NumTilesInTileGroups[i] and TilesToTileGroupMap[j], which specify the number of tiles in the i-th tile group and the mapping of tiles to tile groups, are derived as follows:

```
NumTilesInTileGroups[i] = 0
for(j = 0; j < NumTilesInPatchFrame; j++) {
        if(v >= TileColBd[pfti_top_left_tile_idx[i]] &&
            TileColBd[j] <= TileColBd[botRightTileIdx] &&
            TileRowBd[j] >= TileRowBd[pfti_top_left_tile_idx[i]] &&
            TileRowBd[j] <= TileRowBd[botRightTileIdx]) {
        NumTilesInTileGroups[i]++
        TilesToTileGroupMap[j] = i
        }
}
```
(7-35)

The variables TileGroupWidth[i] and TileGroupHeight[i], which specify the width and height of a tile group respectively, are then computed as follows:

```
TileGroupWidth[i] = 0
TileGroupHeight[i] = 0
for (j = TopLeftTileColumn[i]; j <= BottomRightTileColumn[i]; j++) {
        TileGroupWidth[i] += ColWidth[j] * 64
}
for (j = TopLeftTileRow[i]; j <= BottomRightTileRow[i]; j++) {
        TileGroupHeight[i] += ColHeight[j] * 64
}
```

FIG.9

~~The variables~~ If present, the variables TopTileColumnFraction[i], LeftTileRowFraction[i], BottomTileColumnFraction[i], and RightTileRowFraction[i], which specify the corresponding tile column and row fractions added to the positions defined by TopLeftTileColumn[i], TopLeftTileRow[i], BottomRightTileColumn[i], and BottomRightTileRow[i]~~, which specify the corresponding tile column and row positions~~. Positions for the top left ~~an~~and botton right ~~tiles in~~corners of a tile group are computed as follows:

TopLeftTileColumn[i] = pfti_top_left_tile_idx[i] ~~%~~(- TopTileColumnFraction[i]
    *pfti_~~num~~top_left_tile_~~rows_minus1~~ + idx[i-1~~)~~]

TopLeftTileRow[i] = pfti_top_left_tile_idx[i] ~~%~~(- LeftTileRowFraction[i]
    *pfti_~~num~~top_left_tile_~~rows_minus1~~ + idx[i-1~~)~~]

botRightTileIdx = pfti_top_left_tile_idx[i] + pfti_bottom_right_tile_idx_delta[i]
BottomRightTileColumn[i] = botRightTileIdx ~~% (pfti_num_tile_rows_minus1+1)~~
~~BottomRightTileRow~~[[i]]~~=~~ + BottomTileColumnFraction[i]
    *botRightTileIdx ~~/ (pfti_num_tile_rows_minus1+1)~~[i]

BottomRightTileRow[i] = botRightTileIdx[i] + RightTileRowFraction[i]
    *botRightTileIdx[i]

The variables NumTilesInTileGroups[i] and TilesToTileGroupMap[j], which specify the number of tiles in the i-th tile group and the mapping of tiles to tile groups, are derived as follows:

```
NumTilesInTileGroups[i] = 0
for(j = 0; j < NumTilesInPatchFrame; j++) {
    if(v >= TileColBd[pfti_top_left_tile_idx[i]] &&
        TileColBd[j] <= TileColBd[botRightTileIdx] &&
        TileRowBd[j] >= TileRowBd[pfti_top_left_tile_idx[i]] &&
        TileRowBd[j] <= TileRowBd[botRightTileIdx]) {
        NumTilesInTileGroups[i]++
        TilesToTileGroupMap[j] = i
    }
}
```
(7-35)

The variables TileGroupWidth[i] and TileGroupHeight[i], which specify the width and height of a tile group respectively, are then computed as follows:

```
TileGroupWidth[i] = 0
TileGroupHeight[i] = 0
for (j = TopLeftTileColumn[i]; j <= BottomRightTileColumn[i]; j++) {
    TileGroupWidth[i] += ColWidth[j] * 64
}
for (j = TopLeftTileRow[i]; j <= BottomRightTileRow[i]; j++) {
    TileGroupHeight[i] += ColHeight[j] * 64
}
```

FIG.10

FRACTIONAL/ARBITRARY TILE GROUPING

RELATED APPLICATION

This application claims priority to U.S. Provisional Application No. 62/907,129, filed Sep. 27, 2019, which is hereby incorporated by reference in its entirety.

TECHNICAL FIELD

The examples and non-limiting embodiments relate generally to multimedia and software, and more particularly, to fractional/arbitrary tile grouping.

BACKGROUND

It is known to perform video coding and decoding.

SUMMARY

In accordance with an aspect, an apparatus includes at least one processor; and at least one non-transitory memory including computer program code; wherein the at least one memory and the computer program code are configured to, with the at least one processor, cause the apparatus at least to perform: receive a video presentation frame, wherein the video presentation frame represents three-dimensional data; divide the video presentation frame into a plurality of tiles, wherein one or more of the plurality of tiles may be a fractional tile, as part of a process of encoding the video presentation frame, wherein each tile represents a part of the three-dimensional data of the video presentation frame; group the tiles into one or more groups, wherein individual tiles of the video presentation frame have a capability of not belonging to any of the one or more groups; in response to fractional tiling being present, transmit a signal of fractional tiling related syntax or semantics; and provide an encoded video presentation frame to a decoder, the encoded video presentation frame comprising the grouping of the tiles.

In accordance with an aspect, an apparatus includes at least one processor; and at least one non-transitory memory including computer program code; wherein the at least one memory and the computer program code are configured to, with the at least one processor, cause the apparatus at least to perform: receive an encoded video presentation frame, wherein the video presentation frame represents three-dimensional data; wherein the video presentation frame has been divided into a plurality of tiles, wherein one or more of the plurality of tiles may be a fractional tile, wherein each tile represents a part of the three-dimensional data of the video presentation frame; wherein the tiles have been grouped into one or more groups, wherein individual tiles of the video presentation frame have a capability of not belonging to any of the one or more groups; in response to fractional tiling being present, receive a signal of fractional tiling related syntax or semantics; and provide a decoded video presentation frame, the decoded video presentation frame comprising a reconstruction of the plurality of tiles.

In accordance with an aspect, a method includes receiving a video presentation frame, wherein the video presentation frame represents three-dimensional data; dividing the video presentation frame into a plurality of tiles, wherein one or more of the plurality of tiles may be a fractional tile, as part of a process of encoding the video presentation frame, wherein each tile represents a part of the three-dimensional data of the video presentation frame; grouping the tiles into one or more groups, wherein individual tiles of the video presentation frame have a capability of not belonging to any of the one or more groups; in response to fractional tiling being present, transmitting a signal of fractional tiling related syntax or semantics; and providing an encoded video presentation frame to a decoder, the encoded video presentation frame comprising the grouping of the tiles.

In accordance with an aspect, a method includes receiving an encoded video presentation frame, wherein the video presentation frame represents three-dimensional data; wherein the video presentation frame has been divided into a plurality of tiles, wherein one or more of the plurality of tiles may be a fractional tile, wherein each tile represents a part of the three-dimensional data of the video presentation frame; wherein the tiles have been grouped into one or more groups, wherein individual tiles of the video presentation frame have a capability of not belonging to any of the one or more groups; in response to fractional tiling being present, receiving a signal of fractional tiling related syntax or semantics; and providing a decoded video presentation frame, the decoded video presentation frame comprising a reconstruction of the plurality of tiles.

BRIEF DESCRIPTION OF THE DRAWINGS

The foregoing aspects and other features are explained in the following description, taken in connection with the accompanying drawings, wherein:

FIG. 7 is the description and code showing how tiles are grouped to a tile group according to the PCC specification.

FIG. 9 shows an example of a code implementation of fractional tile grouping.

FIG. 10 shows an example of changes made to the specification to implement fractional tile grouping.

DETAILED DESCRIPTION OF EXAMPLE EMBODIMENTS

Figure 1:
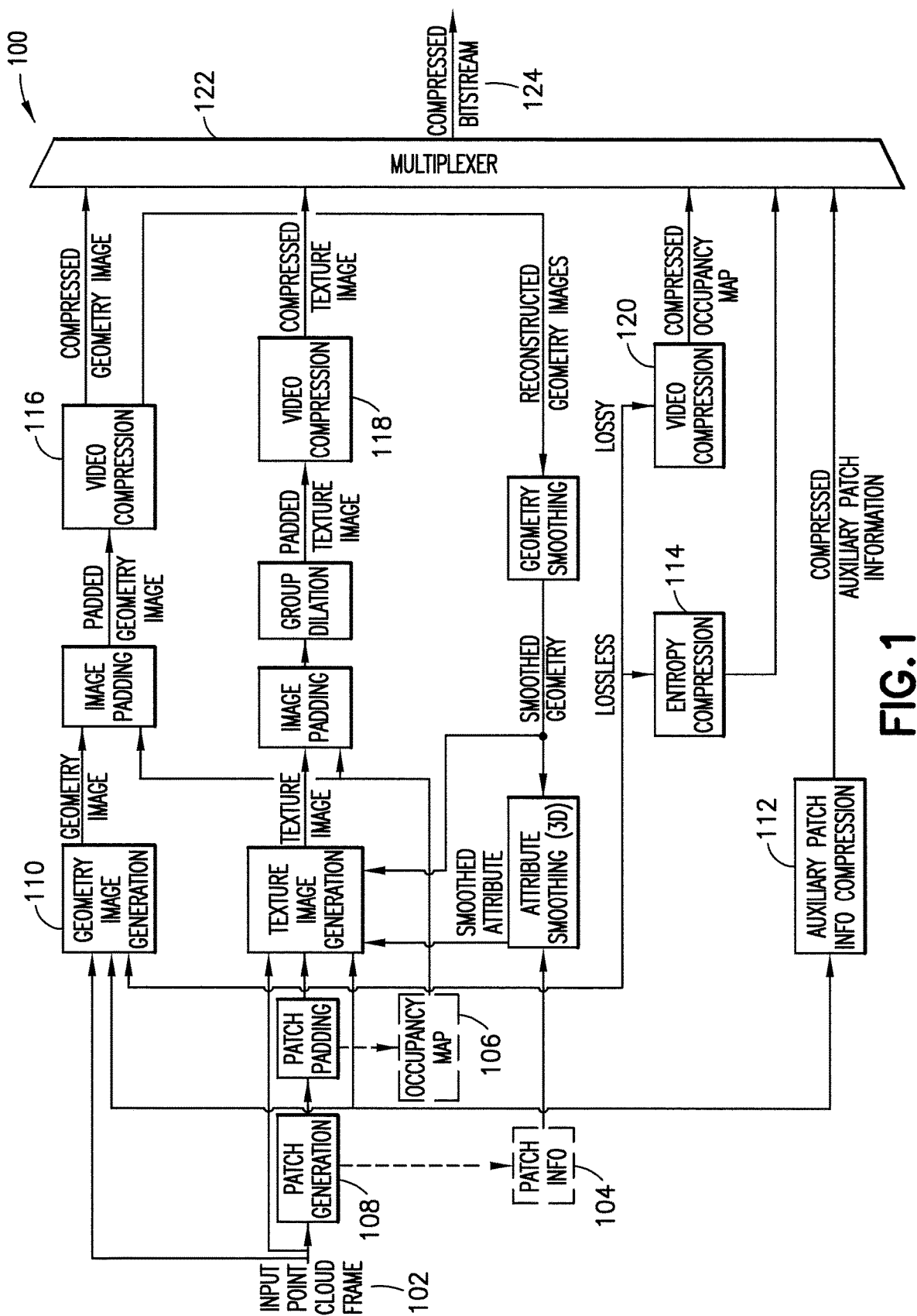
FIG. 1 is a block diagram depicting an overview of the video-based point cloud compression (V-PCC) process.

The following acronyms and abbreviations that may be found in the specification and/or the drawing figures are defined as follows:

2D or 2d two-dimensional
3D or 3d three-dimensional
6DOF six degrees of freedom
bot bottom
AR augmented reality
CD context description
codec coder-decoder
CGI computer-generated imagery
gfp geometry frame parameters
gsp geometry sequence parameters
HEVC high efficiency video coding
HM HEVC test model
id or ID identifier
idx index
info information
IEC International Electrotechnical Commission
I/O input/output
ISO International Organization for Standardization
K-D k-dimensional
MPEG moving picture experts group
MR mixed reality
N # International Organization for Standardization document number
num number
N/W network
params parameters
PCC point cloud compression/coding
pfti patch frame tile index
sps sequence parameter set
TMC2 text model category 2
TMC2v0 text model category 2 version 0
V-PCC video-based point cloud compression/coding
VR virtual reality
W×H width by height The examples described herein relate to the encoding and decoding of digital volumetric video.

Volumetric video data. Volumetric video data represents a three-dimensional scene or object and may be used as input for AR, VR and MR applications. Such data describes geometry (shape, size, position in 3D-space) and respective attributes (e.g. color, opacity, reflectance, plus any possible temporal changes of the geometry and attributes at given time instances (like frames in 2D video). Volumetric video is either generated from 3D models, i.e. CGI, or captured from real-world scenes using a variety of capture solutions, e.g. multi-camera, laser scan, combination of video and dedicated depth sensors, and more. Also, a combination of CGI and real-world data is possible. Typical representation formats for such volumetric data are triangle meshes, point clouds, or voxel. Temporal information about the scene may be included in the form of individual capture instances, i.e. "frames" in 2D video, or other means, e.g. position of an object as a function of time.

Because volumetric video describes a 3D scene (or object), such data can be viewed from any viewpoint. Therefore, volumetric video is an important format for any AR, VR, or MR application, especially for providing 6DOF viewing capabilities.

Increasing computational resources and advances in 3D data acquisition devices has enabled reconstruction of highly detailed volumetric video representations of natural scenes. Infrared, lasers, time-of-flight and structured light are all examples of devices that can be used to construct 3D video data. Representation of the 3D data depends on how the 3D data is used. Dense voxel arrays have been used to represent volumetric medical data. In 3D graphics, polygonal meshes are extensively used. Point clouds on the other hand are well suited for applications such as capturing real world 3D scenes where the topology is not necessarily a 2D manifold. Another way to represent 3D data is coding this 3D data as a set of texture and depth maps as is the case in multi-view plus depth. Closely related to the techniques used in multi-view plus depth is the use of elevation maps, and multi-level surface maps.

Compression of volumetric video data. In dense point clouds or voxel arrays, the reconstructed 3D scene may contain tens or even hundreds of millions of points. If such representations are to be stored or interchanged between entities, then efficient compression becomes essential. Standard volumetric video representation formats, such as point clouds, meshes, voxel, suffer from poor temporal compression performance. Identifying correspondences for motion-compensation in 3D-space is an ill-defined problem, as both, geometry and respective attributes may change. For example, temporal successive "frames" do not necessarily have the same number of meshes, points or voxel. Therefore, compression of dynamic 3D scenes is inefficient. 2D-video based approaches for compressing volumetric data, i.e. multiview+depth, have much better compression efficiency, but rarely cover the full scene. Therefore, they provide only limited 6DOF capabilities.

Instead of the above-mentioned approaches, a 3D scene, represented as meshes, points, and/or voxel, may be projected onto one, or more, geometries. These geometries are "unfolded" onto 2D planes (two planes per geometry: one for texture, one for depth), which are then encoded using standard 2D video compression technologies. Relevant projection geometry information is transmitted alongside the encoded video files to the decoder. The decoder decodes the video and performs the inverse projection to regenerate the 3D scene in any desired representation format (not necessarily the starting format).

Projecting volumetric models onto 2D planes allows for using standard 2D video coding tools with highly efficient temporal compression. Thus, coding efficiency is increased greatly. Using geometry-projections instead of prior-art 2D-video based approaches, i.e. multiview+depth, provide a better coverage of the scene (or object). Thus, 6DOF capabilities are improved. Using several geometries for individual objects improves the coverage of the scene further. Furthermore, standard video encoding hardware may be utilized for real-time compression/decompression of the projected planes. The projection and reverse projection steps are of low complexity.

MPEG Video-Based Point Cloud Coding (V-PCC) Test Model (MPEG N18017). For purposes of clarification, certain selected excerpts of MPEG document N18017 are provided. FIG. and FIG. 2 provide an overview of the compression/decompression processes implemented in V-PCC TMC2. In particular, FIG. 1 is a block diagram 100 depicting an overview of the video-based point cloud compression (V-PCC) compression process, and FIG. 2 is a block diagram 200 depicting an overview of the V-PCC decompression process.

At the encoding stage an input point cloud frame is processed in a following manner: First the volumetric 3d data is represented as a set of 3d projections in different components. At the separation stage the image is decomposed into far and near components for geometry and corresponding attributes components, in addition an occupancy map 2d image is created (106) to indicate parts of an image that may be used. The 2d projection is composed of independent patches (104) based on geometry characteristics of the input point cloud frame (102). After the patches (104) have been generated (108) and 2d frames for video encoding were created the occupancy map (106), geometry information (110) and the auxiliary information may be compressed (112, 114, 116, 118, 120). At the end of the process the separate bit streams are multiplexed (122) into the output compressed binary file (124).

The decoding process starts from demultiplexing (202) of the input compressed into the binary file (124) into geometry (206), attribute (204), occupancy map (208) and auxiliary information (210) streams. The auxiliary information stream (210) is entropy coded (the detailed description of coding methods for auxiliary information compression is provided in MPEG N18017). The occupancy map may be compressed using an entropy coding method, or video compression method depending on a selected level. The geometry stream is decoded (212) and in combination with the occupancy map and auxiliary information, smoothing (214, 216) is applied to reconstruct point cloud geometry information (218). Based on the decoded attribute video stream (220) and reconstructed information for smoothed geometry, occupancy map and auxiliary information the attributes of the point cloud (218) may be reconstructed. After the attribute reconstruction stage an additional attribute smoothing method is used for point cloud refinement.

Figure 2:
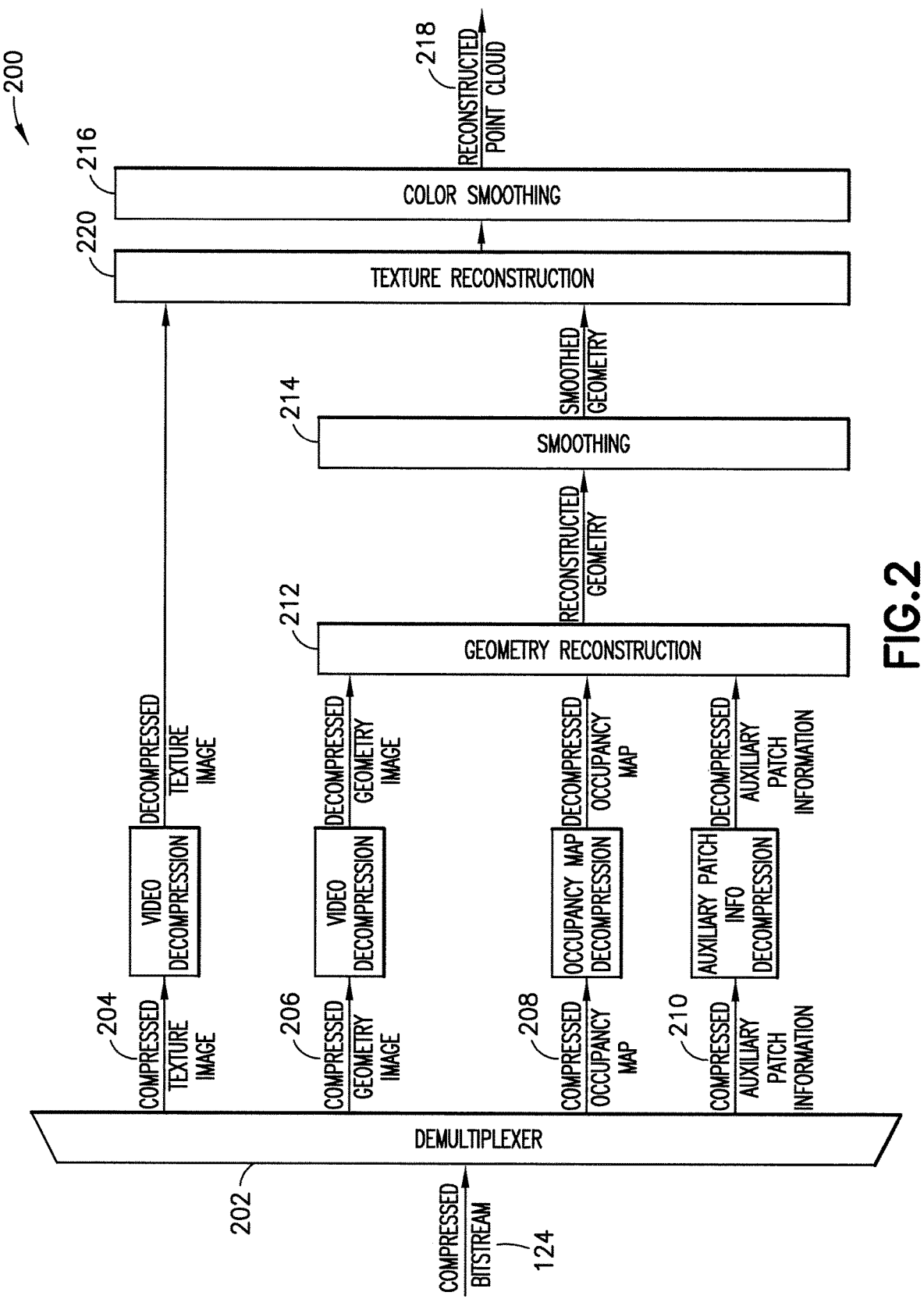
FIG. 2 is a block diagram depicting an overview of the V-PCC decompression process.

Thus, the block structure diagram 100 shown in FIG. 1 is used for encoding while for decoding the block structure diagram 200 in FIG. 2 is used.

Figure 3:
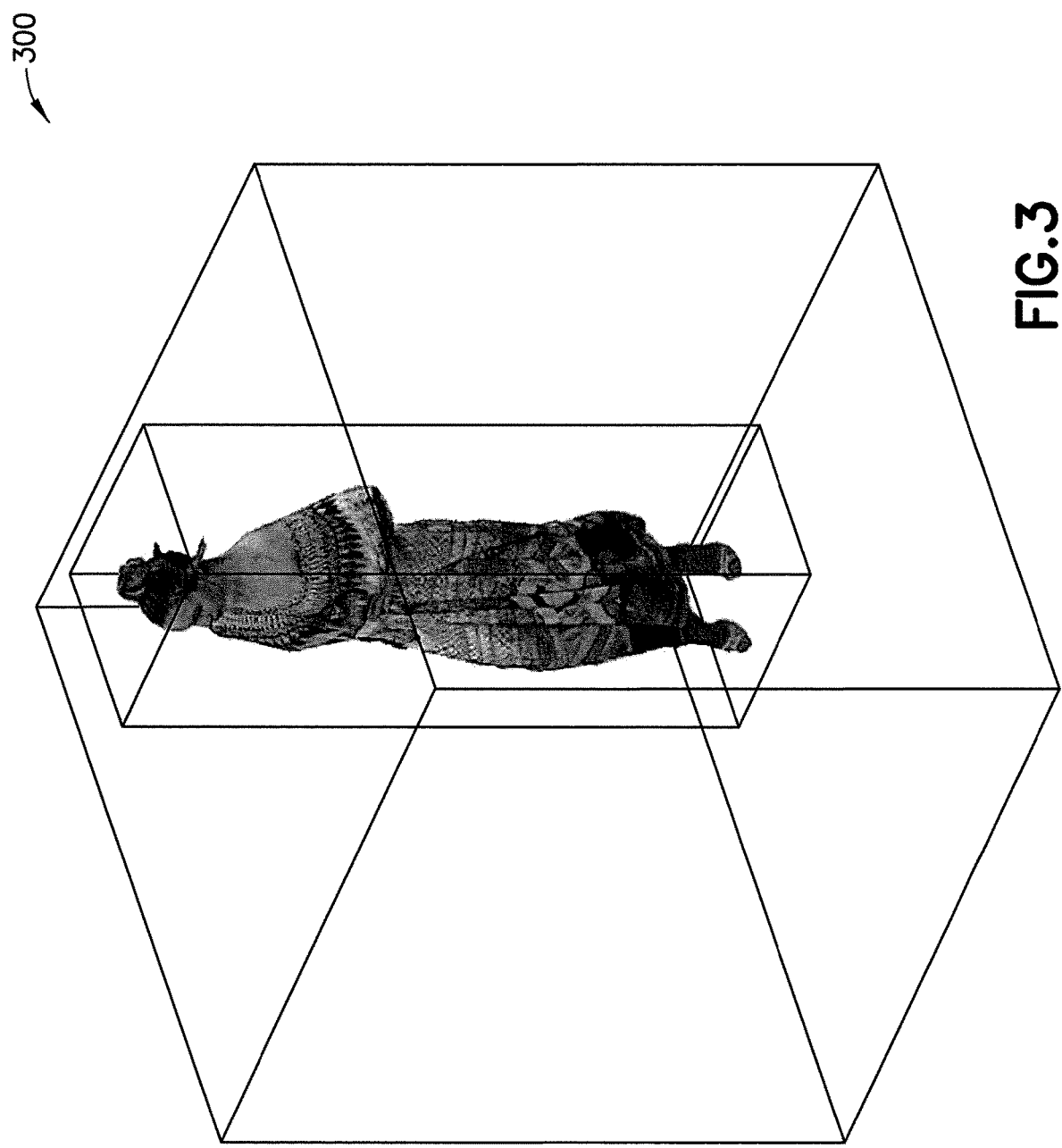
FIG. 3 depicts an example point cloud sample image (1 frame).

Point Cloud Representation in V-PCC. Each point cloud frame represents a dataset of points within a 3D volumetric space that has unique coordinates and attributes. An example of a point cloud frame 300 is shown in FIG. 3.

Patch Generation. The patch generation process decomposes the point cloud frame by converting 3d samples to 2d samples on a given projection plane using a strategy that provides the best compression. In TMC2v0, the patch generation process aims at decomposing the point cloud into a minimum number of patches with smooth boundaries, while also minimizing reconstruction error.

At the initial stage, a normal per each point is estimated. The tangent plane and its corresponding normal are defined per each point, based on the point's nearest neighbors m within a predefined search distance. A K-D tree is used to separate the data and find neighbors in a vicinity of a point $p_i$ and a barycenter $c=\bar{p}$ of that set of points is used to define the normal. The barycenter c is computed as follows:

$$c = \bar{p} = \frac{1}{m}\sum_{i=1}^{m} p_i \qquad (1)$$

The normal is estimated from eigen decomposition for the defined point cloud as:

$$\sum_{i=1}^{m}(p_i-\bar{p})(p_i-\bar{p})^T \qquad (2)$$

Based on this information each point is associated with a corresponding plane of a point cloud bounding box. Each plane is defined by a corresponding normal $\vec{n}_{p_{idx}}$ with values:
(1.0, 0.0, 0.0),
(0.0, 1.0, 0.0),
(0.0, 0.0, 1.0),
(−1.0, 0.0, 0.0),
(0.0, −1.0, 0.0),
(0.0, 0.0, −1.0).

More precisely, each point is associated with the plane that has the closest normal (i.e., maximizes the dot product of the point normal $\vec{n}_{p_i}$ and the plane normal $\vec{n}_{p_{idx}}$).

$$\max_{p_{idx}}\{\vec{n}_{p_i} \cdot \vec{n}_{p_{idx}}\} \qquad (3)$$

Figure 4:
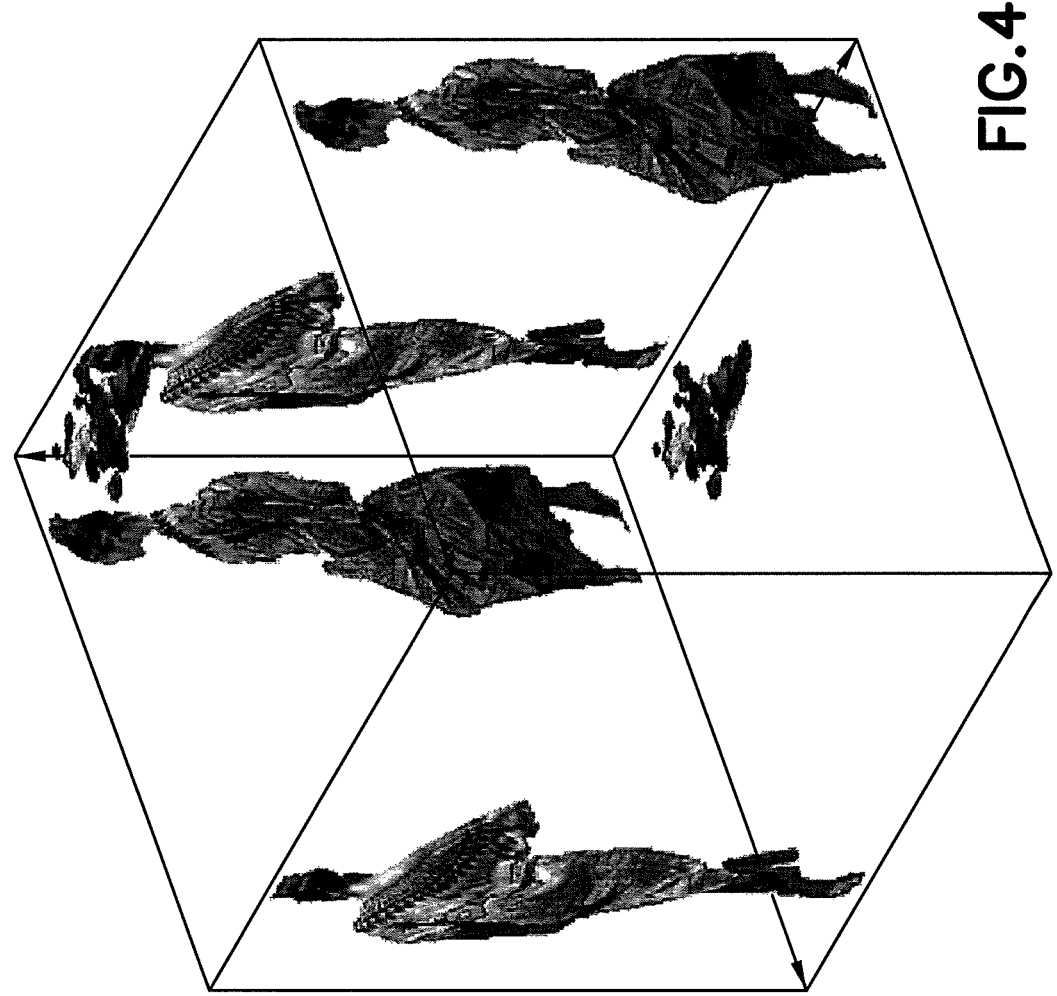
FIG. 4 is an illustration depicting an example point cloud projected onto "bounded-box" planes.

The sign of the normal is defined depending on the point's position in relationship to the "center". The projection estimation description is demonstrated in FIG. 4. FIG. 4 is an illustration 400 depicting an example point cloud projected onto "bounded-box" planes.

The initial clustering is then refined by iteratively updating the clustered index associated with each point based on the point's normal and the cluster indices of the point's nearest neighbors. The next step consists of extracting patches by applying a connected component extraction procedure.

Patch Packing. The patch packing process tries to generate the geometry and texture maps, by appropriately considering the generated patches and by trying to efficiently place the geometry or texture data that correspond to each patch onto a 2D grid of size W×H. Such placement also accounts for a used-defined minimum size block T×T, which specifies the minimum distance between distinct patches as placed on this 2D grid. The corresponding value (T) is encoded and sent to the decoder.

Figure 5B:
FIG. 5B depicts an example of texture images.
Figure 5A:
FIG. 5A depicts an example of projected geometry.

FIG. 5A depicts an example 500 of projected geometry, and FIG. 5B depicts an example 550 of texture images.

The packing method in TMC2 uses an exhaustive search algorithm as follows: Initially, patches are placed on a 2D grid in a manner that would guarantee non-overlapping insertion. Samples belonging to a patch (rounded to a value that is a multiple of T) are considered as occupied blocks. In addition, a safeguard between adjacent patches is forced to a distance of at least one block being a multiple of T. Patches are processed in an orderly manner, based on the patch index list. Each patch from the list is iteratively placed on the grid. The grid resolution depends on the original point cloud size and its width (W) and height (H) are transmitted to the decoder. In the case that there is no empty space available for the next patch the height value of the grid is initially doubled, and the insertion of this patch is evaluated again. If insertion of all patches is successful, then the height is trimmed to the minimum needed value. However, this value is not allowed to be set lower than the originally specified value in the encoder. The final values for W and H correspond to the frame resolution that is used to encode the texture and geometry video signals using the appropriate video codec.

Video compression. The generated images/layers are stored as video frames and compressed using the HM16.16 video codec according to the HM configurations provided as parameters.

Auxiliary patch information. The following meta data is encoded/decoded for every patch:
Index of the projection plane
Index 0 for the planes (1.0, 0.0, 0.0) and (−1.0, 0.0, 0.0)
Index 1 for the planes (0.0, 1.0, 0.0) and (0.0, −1.0, 0.0)
Index 2 for the planes (0.0, 0.0, 1.0) and (0.0, 0.0, −1.0).
2D bounding box (u0, v0, u1, v1)

3D location (x0, y0, z0) of the patch represented in terms of depth δ0, tangential shift s0 and bi-tangential shift r0. According to the chosen projection planes, (δ0, s0, r0) are computed as follows:
Index 0, δ0=x0, s0=z0 and r0=y0
Index 1, δ0=y0, s0=z0 and r0=x0
Index 2, δ0=z0, s0=x0 and r0=y0

Also, mapping information providing for each T×T block its associated patch index is encoded as follows:

For each T×T block, let L be the ordered list of the indexes of the patches such that their 2D bounding box contains that block. The order in the list is the same as the order used to encode the 2D bounding boxes. L is called the list of candidate patches.

The empty space between patches is considered as a patch and is assigned the special index 0, which is added to the candidate patches list of all the blocks.

Let I be index of the patch to which belongs the current T×T block and let J be the position of I in L. Instead of explicitly encoding the index I, its position J is arithmetically encoded instead, which leads to better compression efficiency.

V-PCC Auxiliary information bit stream syntax MEG N18180). The following bit stream syntax is taken from ISO/IEC 23090-5:2018(E) Study of CD, available as MPEG document N18180. Only elements relevant to the examples described herein are selected. Semantics for each syntax element are available in N18180, however, they are not necessary for understanding the examples described herein.

7.3.6 Sequence Parameter Set Syntax

|  | Descriptor |
| --- | --- |
| sequence_parameter_set( ) { |  |
|     profile_tier_level( ) |  |
|     sps_sequence_parameter_set_id | u(4) |
|     sps_frame_width | u(16) |
|     sps_frame_height | u(16) |
|     ... |  |
|     sps_point_local_reconstruction_enabled_flag | u(1) |
|     byte_alignment( ) |  |
| } |  |

7.3.11 Geometry Sequence Params Syntax

|  | Descriptor |
| --- | --- |
| geometry_sequence_params( ) { |  |
|     gsp_geometry_smoothing_params_present_flag | u(1) |
|     gsp_geometry_scale_params_present_flag | u(1) |
|     gsp_geometry_offset_params_present_flag | u(1) |
|     gsp_geometry_rotation_params_present_flag | u(1) |
|     gsp_geometry_point_size_info_present_flag | u(1) |
|     gsp_geometry_point_shape_info_present_flag | u(1) |
|     if( gsp_geometry_smoothing_params_present_flag ) { |  |
|         gsp_geometry_smoothing_enabled_flag | u(1) |
|         if ( gsp_geometry_smoothing_enabled_flag ) { |  |
|             gsp_geometry_grid_size | u(8) |
|             gsp_geometry_smoothing_threshold | u(8) |
|         } |  |
|     } |  |
|     if( gsp_geometry_scale_params_present_flag ) |  |
|         for( d = 0; d < 3; d++ ) |  |
|             gsp_geometry_scale_on_axis[ d ] | u(32) |
|     if( gsp_geometry_offset_params_present_flag ) |  |
|         for( d = 0; d < 3; d++ ) |  |
|             gsp_geometry_offset_on_axis[ d ] | i(32) |
|     if( gsp_geometry_rotation_params_present_flag ) |  |
|         for( d = 0; d < 3; d++ ) |  |
|             gsp_geometry_rotation_on_axis[ d ] | i(32) |
|     if( gsp_geometry_point_size_info_present_flag ) |  |
|         gsp_geometry_point_size_info | u(8) |
|     if( geometry_point_shape_info_present_flag ) |  |
|         gsp_geometry_point_shape_info | u(8) |
| } |  |

7.3.19 Geometry Frame Params Syntax

|  | Descriptor |
| --- | --- |
| geometry_frame_params( ) { |  |
|     gfp_geometry_smoothing_params_present_flag | u(1) |
|     gfp_geometry_scale_params_present_flag | u(1) |
|     gfp_geometry_offset_params_present_flag | u(1) |
|     gfp_geometry_rotation_params_present_flag | u(1) |
|     gfp_geometry_point_size_info_present_flag | u(1) |
|     gfp_geometry_point_shape_info_present_flag | u(1) |
|     if( gfp_geometry_smoothing_params_present_flag ) { |  |
|         gfp_geometry_smoothing_enabled_flag | u(1) |
|         if( gfp_geometry_smoothing_enabled_flag ) { |  |
|             gfp_geometry_smoothing_grid_size | u(8) |
|             gfp_geometry_smoothing_threshold | u(8) |
|         } |  |
|     } |  |
|     if( gfp_geometry_scale_params_present_flag ) |  |
|         for( d = 0; d < 3; d++ ) |  |
|             gfp_geometry_scale_on_axis[ d ] | u(32) |
|     if( gfp_geometry_offset_params_present_flag ) |  |
|         for( d = 0; d < 3; d++ ) |  |
|             gfp_geometry_offset_on_axis[ d ] | i(32) |
|     if( gfp_geometry_rotation_params_present_flag ) |  |
|         for( d = 0; d < 3; d++ ) |  |
|             gfp_geometry_rotation_on_axis[ d ] | i(32) |
|     if( gfp_geometry_point_size_info_present_flag ) |  |
|         gfp_geometry_point_size_info | u(8) |
|     if( gfp_geometry_point_shape_info_present_flag ) |  |
|         gfp_geometry_point_shape_info | u(8) |
| } |  |

7.3.22 Geometry Patch Params Syntax

|  | Descriptor |
| --- | --- |
| geometry_patch_params( ) { |  |
|     if( gfps_geometry_patch_scale_params_enabled_flag ) { |  |
|         gpm_geometry_patch_scale_params_present_flag | u(1) |
|         if( gpm_geometry_patch_scale_params_present_flag) |  |
|             for( d = 0; d < 3; d++ ) |  |
|                 gpm_geometry_patch_scale_on_axis[ d ] | u(32) |
|     } |  |
|     if(gfps_geometry_patch_offset_params_enabled_flag ) { |  |
|         gpm_geometry_patch_offset_params_present_flag | u(1) |
|         if( gpm_geometry_patch_offset_params_presen |  |

-continued

| | Descriptor |
|---|---|
| t_flag ) | |
|     for( d = 0; d < 3; d++ ) | |
|         gpm_geometry_patch_offset_on_axis[ d ] | i(32) |
|     } | |
|     if( | |
| gfps_geometry_patch_rotation_params_enabled_flag | |
| ) { | |
|     gpm_geometry_patch_rotation_params_present_flag | u(1) |
|     if( | |
| gpm_geometry_patch_rotation_params_present_flag | |
| ) | |
|     for( d = 0; d < 3; d++ ) | |
|         gpm_geometry_patch_rotation_on_axis[ d ] | i(32) |
|     } | |
|     if( | |
| gfps_geometry_patch_point_size_info_enabled_flag | |
| ) { | |
|     gpm_geometry_patch_point_size_info_present_flag | u(1) |
|     if( | |
| gpm_geometry_patch_point_size_info_present_flag | |
| ) | |
|     gpm_geometry_patch_point_size_info | u(16) |
|     } | |
|     if( | |
| gfps_geometry_patch_point_shape_info_enabled_flag ) { | |
|     gpm_geometry_patch_point_shape_info_present_flag | u(1) |
|     if( | |
| gpm_geometry_patch_point_shape_info_present_flag | |
| ) | |
|     gpm_geometry_patch_point_shape_info | u(8) |
|     } | |
| } | |

Partitioning of patch frames, tiles, and tile groups. Partitioning of patch frames into tiles and tile groups. This subclause specifies how a patch frame is partitioned into tiles and tile groups. A patch frame is divided into one or more tile rows and one or more tile columns. A tile is a rectangular region of a patch frame. A tile group contains a number of tiles of a patch frame.

Figure 6:
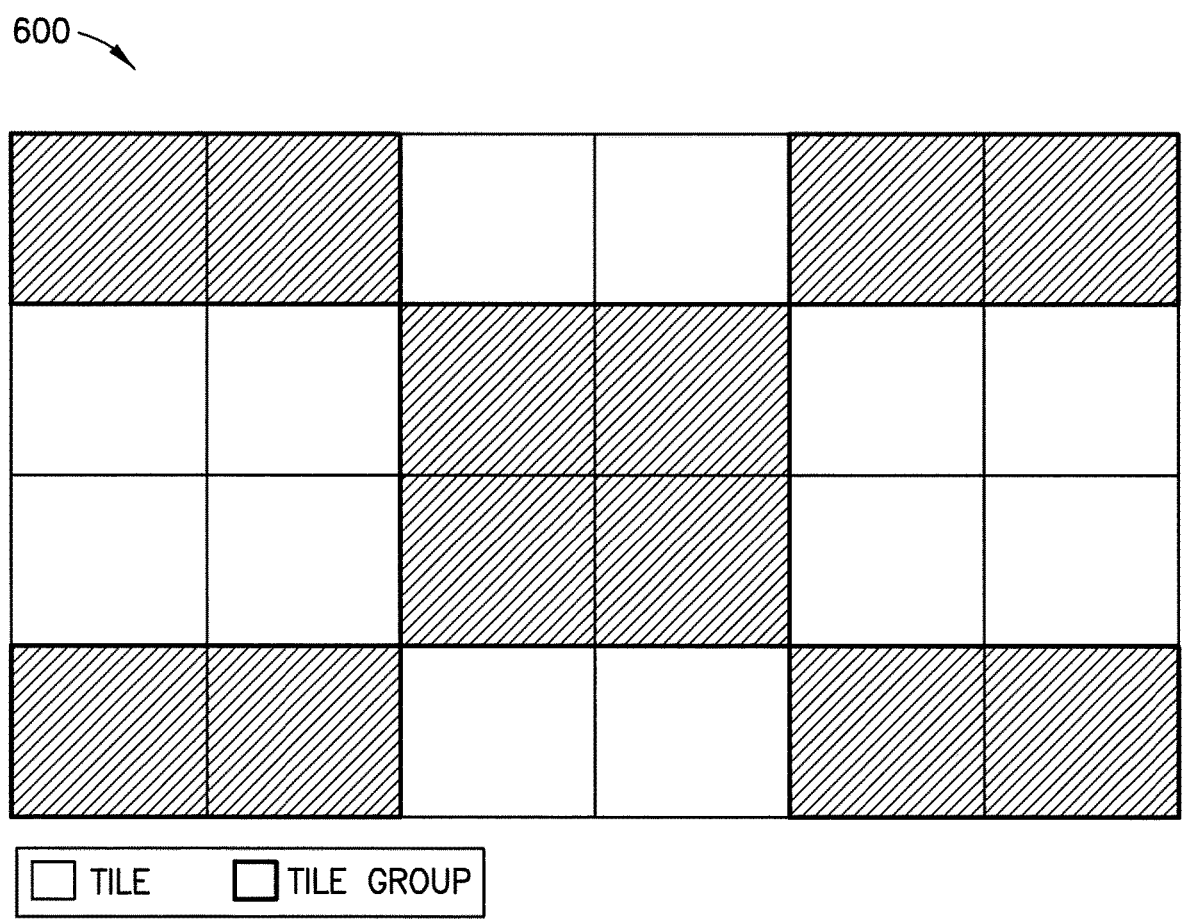
FIG. 6 shows an example tile group partitioning of a patch frame, where the patch frame is divided into 24 tiles (6 tile columns and 4 tile rows) and 9 rectangular tile groups.

Only rectangular tile groups are supported. In this mode, a tile group contains a number of tiles of a patch frame that collectively form a rectangular region of the patch frame. FIG. 6 shows an example 600 tile group partitioning of a patch frame, where the patch frame is divided into 24 tiles (6 tile columns and 4 tile rows) and 9 rectangular tile groups.

One way to compress a time-varying volumetric scene/object, is to project 3D surfaces on to some number of pre-defined 2D planes. Regular 2D video compression algorithms can then be used to compress various aspects of the projected surfaces. Such projection is presented using different patches. Each set of patches may represent a specific object or specific parts of a scene.

In many embodiments, it is required to have the content presented with segmenting them to tiles. A concept of tile grouping is introduced in the PCC specification but is not elaborated enough and does not include fractional tiles belonging to a tile group. This is a needed feature as the content that needs to be grouped in a tile does not necessarily align with the borders of the tiles. Tile grouping is introduced in sub-section 6.2 of the PCC specification.

The examples described herein target enabling including a fraction or fractions of tiles belonging to a tile group and several other embodiments regarding defining the tile grouping in PCC.

The content of each image is divided into tiles. The division to tiles may be done in PCC or may be inherited from any other outside resource e.g. the codec that is being used to compress the content. In any case, the content is being divided into tiles. Currently, there is a concept of tile grouping as introduced in section 6.2 of the PCC Specification, namely ISO/IEC JTC 1/SC 29/WG 11, N18479, Information technology—Coded Representation of Immersive Media—Part 5: Video-based Point Cloud Compression, 2019-05-08.

The examples described herein consider the scene to be presented by several patches. Each patch presents part of the scene. Moreover, each patch or frame may be divided into several tiles.

Based on the specification, the tiles are grouped to a tile group as shown in FIG. 7. Specifically, FIG. 7 is the description and code 700 showing how tiles are grouped to a tile group taken from page 51 of N18479 within the section 7.4.5.13 Patch frame tile information syntax.

Figure 8:
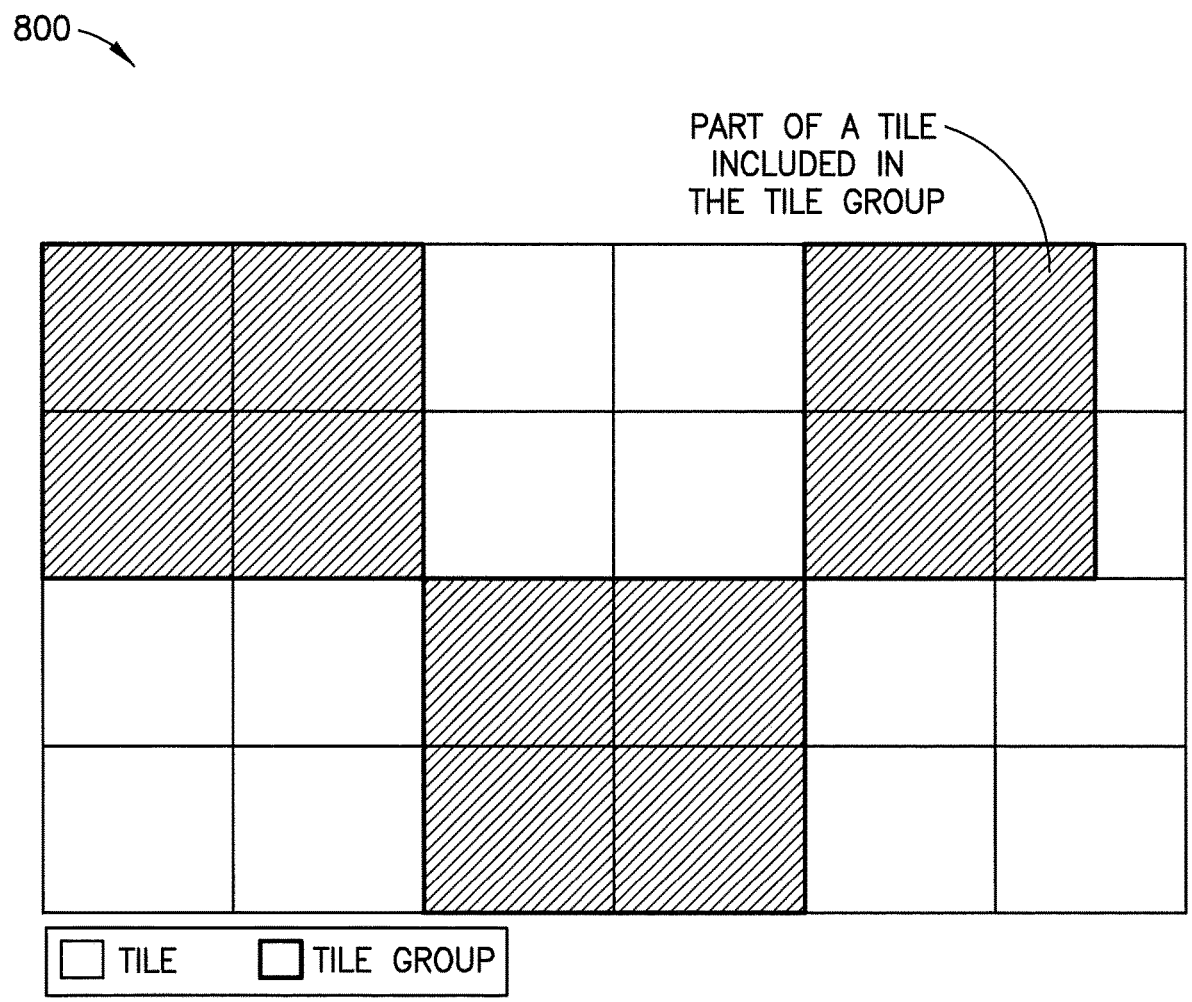
FIG. 8 shows an example of a tile grouping having fractions of two tiles as a member of a tile group.

However, the examples described herein introduce the concept of having only a part of a tile as a member of a tile group. For example, as shown in FIG. 6 the tile groups include only full tiles. However, according to the examples described herein, the tiles may include part of the tile as well, as depicted in FIG. 8. FIG. 8 shows an example 800 of a tile grouping having fractions of two tiles as a member of a tile group. As shown in FIG. 8, the left and bottom tile groups each include 4 tiles and include full tiles. However, the right tile group includes two full tiles and two other tiles are only partially included in the tile group.

In one embodiment, the change introduced in FIG. 8 may be implemented in the specification as indicated by FIG. 9.

FIG. 9 shows an example 900 of a code implementation of fractional tile grouping. Specifically, FIG. 9 implements the capability of one or more groups being comprised of a fraction of one or more tiles is using variables specifying corresponding tile column and row fractions added to positions defined by a top left tile column index, a top left tile row index, a bottom right tile column index, and a bottom right tile row index. The top left tile column index position is calculated as a top left patch frame tile index position minus a top tile column fraction index position times a preceding position of the top left patch frame tile index; the top left tile row index position is calculated as the top left patch frame tile index position minus a left tile row fraction index position times the preceding position of the top left patch frame tile index; the bottom right tile column index position is calculated as a bottom right tile index position plus a bottom tile column fraction index position times a bottom right tile index position; and the bottom right tile row index position is calculated as the bottom right tile index position plus a right tile row fraction index position times the bottom right tile index position.

FIG. 10 shows an example 1000 of changes made to the specification to implement fractional tile grouping. In particular, in FIG. 10, the marked part of the code represents the introduced changes to the semantics. In FIG. 10, text that has been striked through is text that is removed from the specification according to examples described herein, and text that has been underlined is text that is added to the specification according to examples described herein.

In an embodiment, a flag is signaled in or along the bitstream to indicate fractional tiling. If the flag is present, the above mentioned syntax elements and respective semantics may be available to the decoder.

Figure 11:
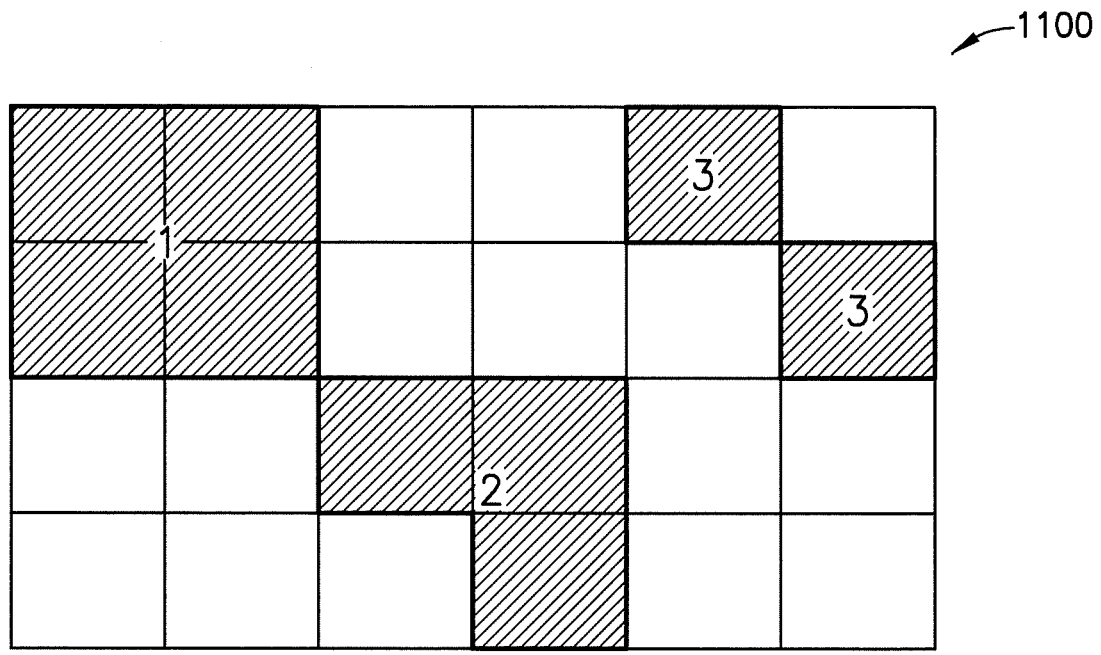
FIG. 11 shows an example where the tiles included in a tile group may come from different parts of the image where there is no border shared between the tiles.

In another embodiment, the tile groups may not necessarily have a rectangular shape. This means, the tiles included in a tile group may come from different parts of the image where there is no border shared between the tiles. One example of this is shown in FIG. 11. This is important for cases where there are similar objects in different parts of the image and should be grouped into the same tile group. For example there are few cars scattered in the scene and they are to be put into the same tile group. Similarly, there may be different people in the image which are located in different parts of the scene and therefore should be categorized in the same tile group.

FIG. 11 shows an example 1100 where the tiles included in a tile group may come from different parts of the image where there is no border shared between the tiles. Thus FIG. 11 depicts a non rectangular (arbitrary tile grouping). In FIG. 11, three tile groups are defined as shown with numbers i.e. 1, 2 and 3. The current definition of tile groups does not allow tile groups 2 and 3 as they are not rectangular. However, the examples described herein introduce the definition of such tile groups.

Figure 12:
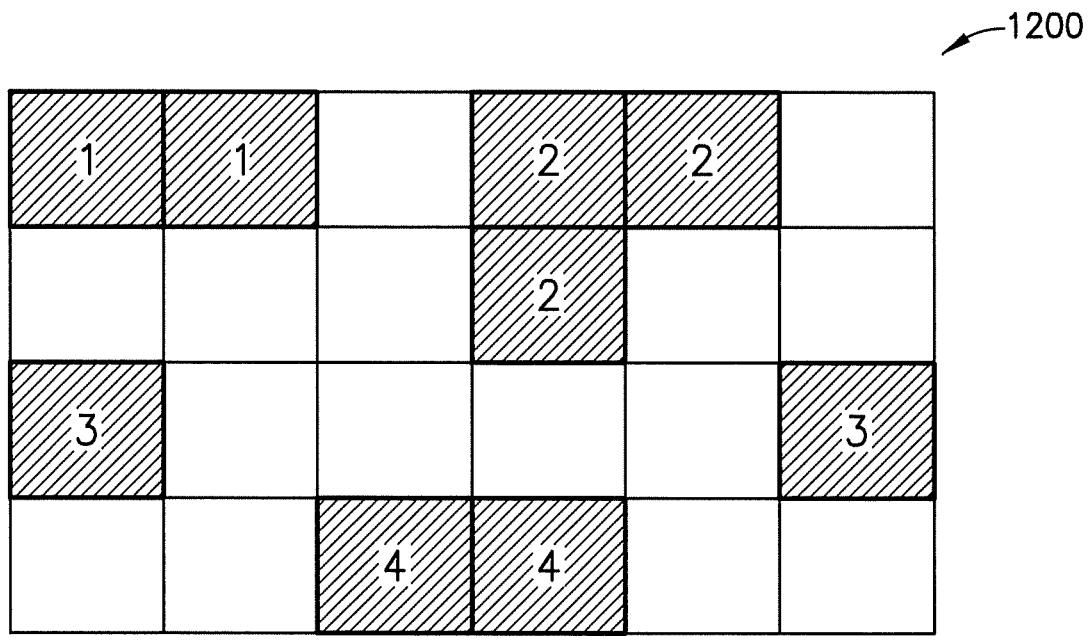
FIG. 12 shows an example where the members of a tile group may not have any touching point.

In another embodiment, the members of a tile group may not have any touching point, meaning that they are not adjacent horizontally, vertically, or diagonally. This is shown in FIG. 12, where the numbers indicate the group number that the tile belongs to. It should be noted that similar fractional tile selection may also be incorporated to this embodiment, meaning that that the tile group may include non-adjacent tiles or tile parts. Thus, FIG. 12 shows an example 1200 where the members of a tile group may not have any touching point. As depicted in FIG. 12, tile group 3 includes two tiles which are not adjacent.

In another embodiment, one tile may belong to more than one tile group. This means, one tile may belong to at least two tile groups e.g. a face belongs to a tile group including women and also to a tile group including people. It should be noted that a part of a tile may belong to one tile group while same part or another part of the same tile belongs to another tile group. This flexibility is covered already considering the preferred embodiment of this invention as explained above.

In another embodiment, a tile may have a signal mentioning that it does not belong to any tile group. This means, any tile having this flag equal to for example 1, is not a member of any tile group.

Figure 13:
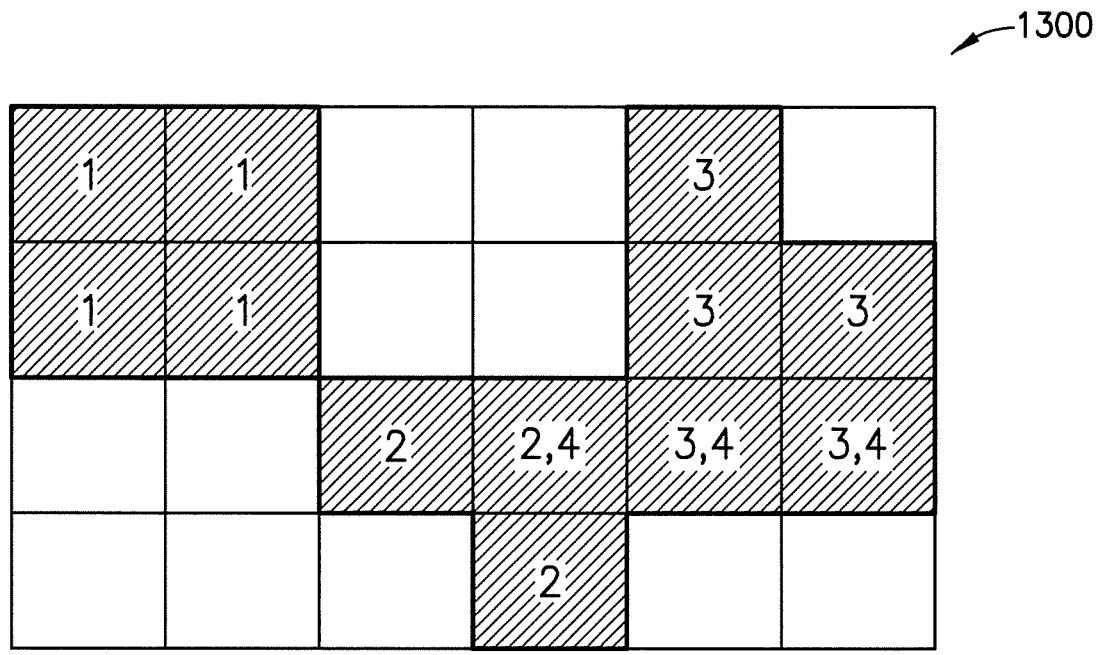
FIG. 13 shows an example where the same tiles may belong to more than one tile group.

In yet another embodiment, the same tiles may belong to more than one tile group. This is shown in FIG. 13 where one full tile belongs to both tile groups 2 and 4 and two full tiles belong to both tile groups 3 and 4. Accordingly, FIG. 13 shows an example 1300 where the same tiles may belong to more than one tile group.

Figure 14:
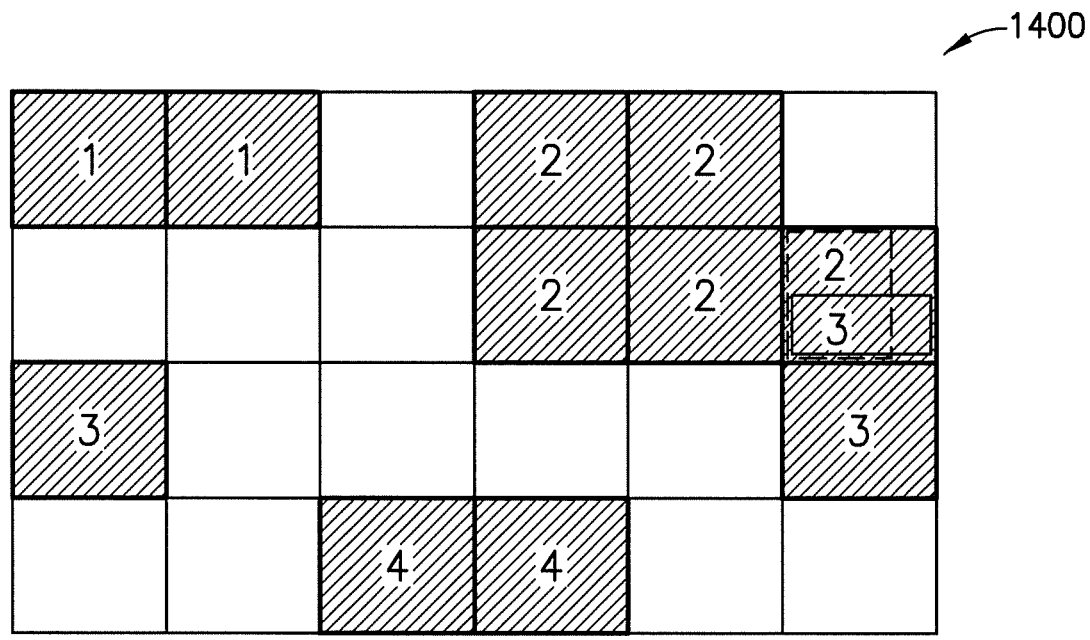
FIG. 14 is an example showing a tile group with fractional parts belonging to different tile groups.

It should be noted that this embodiment may be used along with any of the previously described embodiments meaning that a tile may be fractionally divided, and each fraction may belong to one or more tile groups and the fractions may have overlapping parts as well. This is further clarified in FIG. 14 where one tile has different fractional parts and each part may belong to at least one tile group. Thus, FIG. 14 is an example 1400 showing a tile group with fractional parts belonging to different tile groups. In this embodiment, tile group 2 includes part of one tile which is shared with tile group 3. There may be overlap between the tile fractions that belong to each tile group. The tile fractions do not necessarily have to cover the whole tile as shown in FIG. 14 where the fractions of the shared tile belonging to tile groups 2 and 3 do not cover the whole tile.

The examples described herein provide the following benefits and technical effects: i) Enables defining tile groups including fractional tiles; ii) Enables having non-rectangular tiles in the tile group; iii) Enables having non-touching tiles belonging to the same tile group; iv) Enables sharing tiles or tile fractions between tile groups. Furthermore, the examples described herein may be contribute to MPEG Point Cloud Compression standardization activities.

Figure 15:
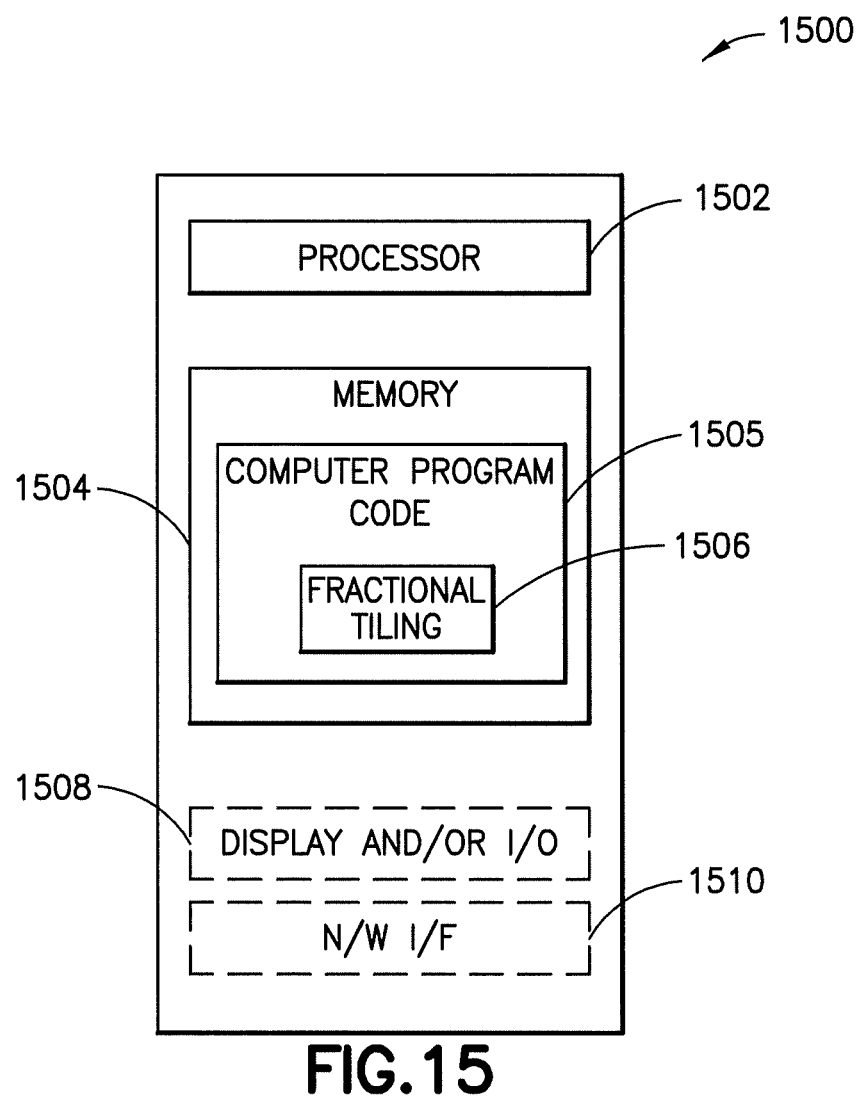
FIG. 15 is an apparatus configured to implement an encoder or decoder that supports fractional tiling.

FIG. 15 is an apparatus 1500 which may be implemented in hardware, configured to implement an encoder or decoder that supports fractional tiling. The apparatus comprises a processor 1502, at least one non-transitory memory 1504 including computer program code 1505, wherein the at least one memory 1504 and the computer program code 1505 are configured to, with the at least one processor 1502, cause the apparatus to implement circuitry, a process, component, module, or function (collectively 1506) to implement fractional tiling based on the examples described herein. The apparatus 1500 optionally includes a display and/or I/O interface 1508 that may be used to display an output (e.g., an image) of a result of an encoding or decoding. The display and/or I/O interface 1508 may also be configured to receive input such as user input. The apparatus 1500 also optionally includes one or more network (NW) interfaces (I/F(s)) 1510. The NW I/F(s) 1510 may be wired and/or wireless and communicate over the Internet/other network (s) via any communication technique. The NW I/F(s) 1510 may comprise one or more transmitters and one or more receivers. The apparatus 1500 may be an encoder or decoder or another apparatus that is used or implemented by an encoder or decoder, and the apparatus 1500 may be a remote, virtual or cloud apparatus.

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory 1504 may be implemented using any suitable data storage technology, such as semiconductor based memory devices, flash memory, magnetic memory devices and systems, optical memory devices and systems, fixed memory and removable memory. The memory 1504 may comprise a database for storing data.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

Figure 16:
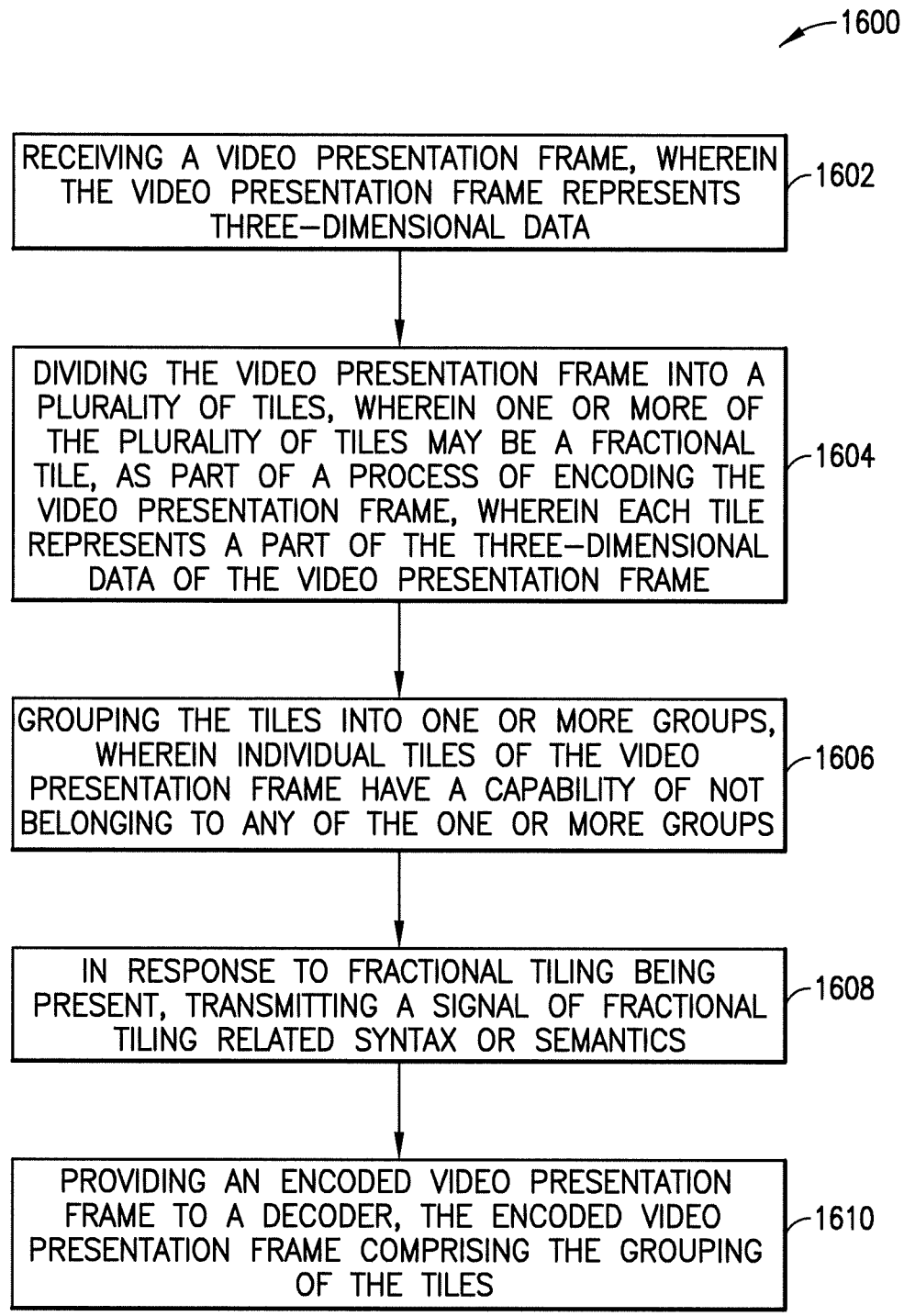
FIG. 16 is an example method to implement an encoder that supports fractional tiling.

FIG. 16 is an example method 1600 to implement an encoder that supports fractional tiling. At 1602, the method includes receiving a video presentation frame, wherein the video presentation frame represents three-dimensional data. At 1604, the method includes dividing the video presentation frame into a plurality of tiles, wherein one or more of the plurality of tiles may be a fractional tile, as part of a process of encoding the video presentation frame, wherein each tile represents a part of the three-dimensional data of the video presentation frame. At 1606, the method includes grouping the tiles into one or more groups, wherein individual tiles of the video presentation frame have a capability of not belonging to any of the one or more groups. At 1608, the method includes in response to fractional tiling being present, transmitting a signal of fractional tiling related syntax or semantics. At 1610, the method includes providing an encoded video presentation frame to a decoder, the encoded video presentation frame comprising the grouping of the tiles.

Figure 17:
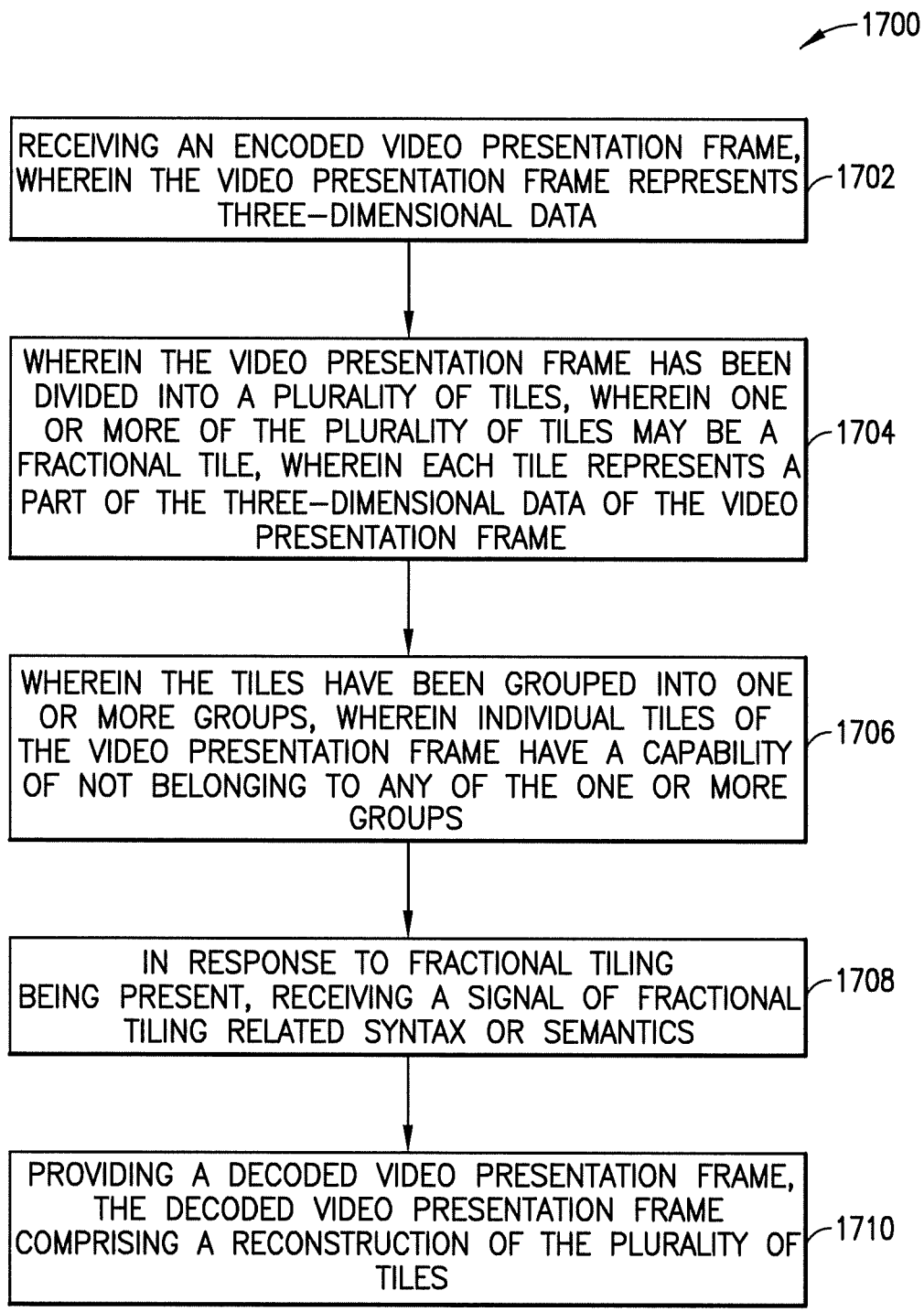
FIG. 17 is an example method to implement a decoder that supports fractional tiling.

FIG. 17 is an example method 1700 to implement a decoder that supports fractional tiling. At 1702, the method includes receiving an encoded video presentation frame, wherein the video presentation frame represents three-dimensional data. At 1704, the method includes wherein the video presentation frame has been divided into a plurality of tiles, wherein one or more of the plurality of tiles may be a fractional tile, wherein each tile represents a part of the three-dimensional data of the video presentation frame. At 1706, the method includes wherein the tiles have been grouped into one or more groups, wherein individual tiles of the video presentation frame have a capability of not belonging to any of the one or more groups. At 1708, the method includes in response to fractional tiling being present, receiving a signal of fractional tiling related syntax or semantics. At 1710, the method includes providing a decoded video presentation frame, the decoded video presentation frame comprising a reconstruction of the plurality of tiles.

An example apparatus includes at least one processor; and at least one non-transitory memory including computer program code; wherein the at least one memory and the computer program code are configured to, with the at least one processor, cause the apparatus at least to perform: receive a video presentation frame, wherein the video presentation frame represents three-dimensional data; divide the video presentation frame into a plurality of tiles, wherein one or more of the plurality of tiles may be a fractional tile, as part of a process of encoding the video presentation frame, wherein each tile represents a part of the three-dimensional data of the video presentation frame; group the tiles into one or more groups, wherein individual tiles of the video presentation frame have a capability of not belonging to any of the one or more groups; in response to fractional tiling being present, transmit a signal of fractional tiling related syntax or semantics; and provide an encoded video presentation frame to a decoder, the encoded video presentation frame comprising the grouping of the tiles.

The apparatus may further include wherein the one or more groups is comprised of a fraction of at least one tile of the plurality of tiles.

The apparatus may further include wherein tiles of a group come from different parts of an image where there is no border shared between the tiles.

The apparatus may further include wherein members of a tile group do not have a touching point such that said members are not at all adjacent.

The apparatus may further include wherein one tile belongs to more than one tile group.

The apparatus may further include wherein a tile does not belong to any tile group.

The apparatus may further include wherein a tile having a first fractional part belongs to a first group, and wherein the tile having a second fractional part belongs to a second group different from the first group.

The apparatus may further include wherein the fractional tiling related syntax or semantics is signaled to a decoder by a flag in or along a bitstream representing the video presentation frame.

The apparatus may further include wherein the capability of the one or more groups being comprised of a fraction of the plurality of tiles is implemented by variables specifying corresponding tile column and row fractions added to positions defined by a top left tile column index, a top left tile row index, a bottom right tile column index, and a bottom right tile row index.

The apparatus may further include wherein: the top left tile column index position is calculated as a top left patch frame tile index position minus a top tile column fraction index position times a preceding position of the top left patch frame tile index; the top left tile row index position is calculated as the top left patch frame tile index position minus a left tile row fraction index position times the preceding position of the top left patch frame tile index; the bottom right tile column index position is calculated as a bottom right tile index position plus a bottom tile column fraction index position times a bottom right tile index position; and the bottom right tile row index position is calculated as the bottom right tile index position plus a right tile row fraction index position times the bottom right tile index position.

The apparatus may further include wherein the at least one memory and the computer program code are further configured to, with the at least one processor, cause the apparatus at least to perform: partition a plurality of patch frames into the one or more groups, each patch frame representing a part of content of a scene of the three-dimensional data, wherein the partitioning of the plurality of patch frames into one or more groups is performed during point cloud compression or inherited from an outside resource.

An example apparatus includes at least one processor; and at least one non-transitory memory including computer program code; wherein the at least one memory and the computer program code are configured to, with the at least one processor, cause the apparatus at least to perform: receive an encoded video presentation frame, wherein the video presentation frame represents three-dimensional data; wherein the video presentation frame has been divided into a plurality of tiles, wherein one or more of the plurality of tiles may be a fractional tile, wherein each tile represents a part of the three-dimensional data of the video presentation frame; wherein the tiles have been grouped into one or more groups, wherein individual tiles of the video presentation frame have a capability of not belonging to any of the one or more groups; in response to fractional tiling being present, receive a signal of fractional tiling related syntax or semantics; and provide a decoded video presentation frame, the decoded video presentation frame comprising a reconstruction of the plurality of tiles.

The apparatus may further include wherein the one or more groups is comprised of a fraction of at least one tile of the plurality of tiles.

The apparatus may further include wherein tiles of a group come from different parts of an image where there is no border shared between the tiles.

The apparatus may further include wherein members of a tile group do not have a touching point such that said members are not at all adjacent.

The apparatus may further include wherein one tile belongs to more than one tile group.

The apparatus may further include wherein a tile does not belong to any tile group.

The apparatus may further include wherein a tile having a first fractional part belongs to a first group, and wherein the tile having a second fractional part belongs to a second group different from the first group.

The apparatus may further include wherein the fractional tiling related syntax or semantics is signaled to a decoder by a flag in or along a bitstream representing the video presentation frame.

The apparatus may further include wherein the capability of the one or more groups being comprised of a fraction of the plurality of tiles is implemented by variables specifying corresponding tile column and row fractions added to positions defined by a top left tile column index, a top left tile row index, a bottom right tile column index, and a bottom right tile row index.

The apparatus may further include wherein: the top left tile column index position is calculated as a top left patch frame tile index position minus a top tile column fraction index position times a preceding position of the top left patch frame tile index; the top left tile row index position is calculated as the top left patch frame tile index position minus a left tile row fraction index position times the preceding position of the top left patch frame tile index; the bottom right tile column index position is calculated as a bottom right tile index position plus a bottom tile column fraction index position-times a bottom right tile index position; and the bottom right tile row index position is calculated as the bottom right tile index position plus a right tile row fraction index position times the bottom right tile index position.

The apparatus may further include wherein a plurality of patch frames has been partitioned into the one or more groups, each patch frame representing a part of content of a scene of the three-dimensional data, wherein the partitioning of the plurality of patch frames into one or more groups is performed during point cloud compression or inherited from an outside resource.

An example method includes receiving a video presentation frame, wherein the video presentation frame represents three-dimensional data; dividing the video presentation frame into a plurality of tiles, wherein one or more of the plurality of tiles may be a fractional tile, as part of a process of encoding the video presentation frame, wherein each tile represents a part of the three-dimensional data of the video presentation frame; grouping the tiles into one or more groups, wherein individual tiles of the video presentation frame have a capability of not belonging to any of the one or more groups; in response to fractional tiling being present, transmitting a signal of fractional tiling related syntax or semantics; and providing an encoded video presentation frame to a decoder, the encoded video presentation frame comprising the grouping of the tiles.

The method may further include wherein the one or more groups is comprised of a fraction of at least one tile of the plurality of tiles.

The method may further include wherein tiles of a group come from different parts of an image where there is no border shared between the tiles.

The method may further include partitioning a plurality of patch frames into the one or more groups, each patch frame representing a part of content of a scene of the three-dimensional data, wherein the partitioning of the plurality of patch frames into one or more groups is performed during point cloud compression or inherited from an outside resource.

The method may further include wherein members of a tile group do not have a touching point such that said members are not at all adjacent.

The method may further include wherein one tile belongs to more than one tile group.

The method may further include wherein a tile does not belong to any tile group.

The method may further include wherein a tile having a first fractional part belongs to a first group, and wherein the tile having a second fractional part belongs to a second group different from the first group.

The method may further include wherein the fractional tiling related syntax or semantics is signaled to a decoder by a flag in or along a bitstream representing the video presentation frame.

The method may further include wherein the capability of the one or more groups being comprised of a fraction of the plurality of tiles is implemented by variables specifying corresponding tile column and row fractions added to positions defined by a top left tile column index, a top left tile row index, a bottom right tile column index, and a bottom right tile row index.

The method may further include wherein: the top left tile column index position is calculated as a top left patch frame tile index position minus a top tile column fraction index position times a preceding position of the top left patch frame tile index; the top left tile row index position is calculated as the top left patch frame tile index position minus a left tile row fraction index position times the preceding position of the top left patch frame tile index; the bottom right tile column index position is calculated as a bottom right tile index position plus a bottom tile column fraction index position times a bottom right tile index position; and the bottom right tile row index position is calculated as the bottom right tile index position plus a right tile row fraction index position times the bottom right tile index position.

An example method includes receiving an encoded video presentation frame, wherein the video presentation frame represents three-dimensional data; wherein the video presentation frame has been divided into a plurality of tiles, wherein one or more of the plurality of tiles may be a fractional tile, wherein each tile represents a part of the three-dimensional data of the video presentation frame; wherein the tiles have been grouped into one or more groups, wherein individual tiles of the video presentation frame have a capability of not belonging to any of the one or more groups; in response to fractional tiling being present, receiving a signal of fractional tiling related syntax or semantics; and providing a decoded video presentation frame, the decoded video presentation frame comprising a reconstruction of the plurality of tiles.

The method may further include wherein the one or more groups is comprised of a fraction of at least one tile of the plurality of tiles.

The method may further include wherein tiles of a group come from different parts of an image where there is no border shared between the tiles.

The method may further include wherein a plurality of patch frames has been partitioned into the one or more groups, each patch frame representing a part of content of a scene of the three-dimensional data, wherein the partitioning of the plurality of patch frames into one or more groups is performed during point cloud compression or inherited from an outside resource.

The method may further include wherein members of a tile group do not have a touching point such that said members are not at all adjacent.

The method may further include wherein one tile belongs to more than one tile group.

The method may further include wherein a tile does not belong to any tile group.

The method may further include wherein a tile having a first fractional part belongs to a first group, and wherein the tile having a second fractional part belongs to a second group different from the first group.

The method may further include wherein the fractional tiling related syntax or semantics is signaled to a decoder by a flag in or along a bitstream representing the video presentation frame.

The method may further include wherein the capability of the one or more groups being comprised of a fraction of the plurality of tiles is implemented by variables specifying corresponding tile column and row fractions added to positions defined by a top left tile column index, a top left tile row index, a bottom right tile column index, and a bottom right tile row index.

The method may further include wherein: the top left tile column index position is calculated as a top left patch frame tile index position minus a top tile column fraction index position times a preceding position of the top left patch frame tile index; the top left tile row index position is calculated as the top left patch frame tile index position minus a left tile row fraction index position times the preceding position of the top left patch frame tile index; the bottom right tile column index position is calculated as a bottom right tile index position plus a bottom tile column fraction index position times a bottom right tile index position; and the bottom right tile row index position is calculated as the bottom right tile index position plus a right tile row fraction index position times the bottom right tile index position.

An example non-transitory program storage device, a non-transitory program storage device readable by a machine, tangibly embodying a program of instructions executable by the machine for performing operations may be provided, the operations comprising: receiving a video presentation frame, wherein the video presentation frame represents three-dimensional data; dividing the video presentation frame into a plurality of tiles, wherein one or more of the plurality of tiles may be a fractional tile, as part of a process of encoding the video presentation frame, wherein each tile represents a part of the three-dimensional data of the video presentation frame; grouping the tiles into one or more groups, wherein individual tiles of the video presentation frame have a capability of not belonging to any of the one or more groups; in response to fractional tiling being present, transmitting a signal of fractional tiling related syntax or semantics; and providing an encoded video presentation frame to a decoder, the encoded video presentation frame comprising the grouping of the tiles.

An example non-transitory program storage device, a non-transitory program storage device readable by a machine, tangibly embodying a program of instructions executable by the machine for performing operations may be provided, the operations comprising: receiving an encoded video presentation frame, wherein the video presentation frame represents three-dimensional data; wherein the video presentation frame has been divided into a plurality of tiles, wherein one or more of the plurality of tiles may be a fractional tile, wherein each tile represents a part of the three-dimensional data of the video presentation frame; wherein the tiles have been grouped into one or more groups, wherein individual tiles of the video presentation frame have a capability of not belonging to any of the one or more groups; in response to fractional tiling being present, receiving a signal of fractional tiling related syntax or semantics; and providing a decoded video presentation frame, the decoded video presentation frame comprising a reconstruction of the plurality of tiles.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
   at least one processor; and
   at least one non-transitory memory including computer program code;
   wherein the at least one memory and the computer program code are configured to, with the at least one processor, cause the apparatus at least to perform:
   receive a video presentation frame, wherein the video presentation frame represents three-dimensional data;
   divide the video presentation frame into a plurality of tiles, wherein one or more of the plurality of tiles may be a fractional tile, as part of a process of encoding the video presentation frame, wherein each tile represents a part of the three-dimensional data of the video presentation frame;
   group the tiles into two or more groups, wherein individual tiles of the video presentation frame have a capability of not belonging to any of the two or more groups;
   wherein a first one of the tiles comprises a first fractional part that belongs to a first group of the groups, and wherein the first one of the tiles comprises a second fractional part that belongs to a second group of the groups, the second group being different from the first group;
   signal a flag indicating fractional tiling, and transmit a signal of fractional tiling related syntax or semantics; and
   provide an encoded video presentation frame to a decoder, the encoded video presentation frame comprising the grouping of the tiles.

2. The apparatus of claim 1, wherein the two or more groups are comprised of a fraction of at least one tile of the plurality of tiles.

3. The apparatus of claim 1, wherein tiles of a group come from different parts of an image where there is no border shared between the tiles.

4. The apparatus of claim 1, wherein members of a tile group do not have a touching point such that said members are not at all adjacent.

5. The apparatus of claim 1, wherein the fractional tiling related syntax or semantics is signaled to a decoder with the flag in or along a bitstream representing the video presentation frame.

6. The apparatus of claim 1, wherein the capability of the two or more groups being comprised of a fraction of the plurality of tiles is implemented by variables specifying corresponding tile column and row fractions added to positions defined by a top left tile column index, a top left tile row index, a bottom right tile column index, and a bottom right tile row index.

7. The apparatus of claim 6, wherein:
the top left tile column index position is calculated as a top left patch frame tile index position minus a top tile column fraction index position times a preceding position of the top left patch frame tile index;
the top left tile row index position is calculated as the top left patch frame tile index position minus a left tile row fraction index position times the preceding position of the top left patch frame tile index;
the bottom right tile column index position is calculated as a bottom right tile index position plus a bottom tile column fraction index position times a bottom right tile index position; and
the bottom right tile row index position is calculated as the bottom right tile index position plus a right tile row fraction index position times the bottom right tile index position.

8. The apparatus of claim 1, wherein the at least one memory and the computer program code are further configured to, with the at least one processor, cause the apparatus at least to perform:
partition a plurality of patch frames into the two or more groups, each patch frame representing a part of content of a scene of the three-dimensional data, wherein the partitioning of the plurality of patch frames into two or more groups is performed during point cloud compression or inherited from an outside resource.

9. An apparatus comprising:
at least one processor; and
at least one non-transitory memory including computer program code;
wherein the at least one memory and the computer program code are configured to, with the at least one processor, cause the apparatus at least to perform:
receive an encoded video presentation frame, wherein the video presentation frame represents three-dimensional data;
wherein the video presentation frame has been divided into a plurality of tiles, wherein one or more of the plurality of tiles may be a fractional tile, wherein each tile represents a part of the three-dimensional data of the video presentation frame;
wherein the tiles have been grouped into two or more groups, wherein individual tiles of the video presentation frame have a capability of not belonging to any of the two or more groups;
wherein a first one of the tiles comprises a first fractional part that belongs to a first group of the groups, and wherein the first one of the tiles comprises a second fractional part that belongs to a second group of the groups, the second group being different from the first group;
receive a flag indicating fractional tiling, and receive a signal of fractional tiling related syntax or semantics; and
provide a decoded video presentation frame, the decoded video presentation frame comprising a reconstruction of the plurality of tiles.

10. The apparatus of claim 9, wherein the two or more groups are comprised of a fraction of at least one tile of the plurality of tiles.

11. The apparatus of claim 9, wherein tiles of a group come from different parts of an image where there is no border shared between the tiles.

12. The apparatus of claim 9, wherein members of a tile group do not have a touching point such that said members are not at all adjacent.

13. The apparatus of claim 9, wherein the signal of the fractional tiling related syntax or semantics is received with a decoder with the flag in or along a bitstream representing the video presentation frame.

14. The apparatus of claim 9, wherein the capability of the two or more groups being comprised of a fraction of the plurality of tiles is implemented by variables specifying corresponding tile column and row fractions added to positions defined by a top left tile column index, a top left tile row index, a bottom right tile column index, and a bottom right tile row index.

15. The apparatus of claim 14, wherein:
the top left tile column index position is calculated as a top left patch frame tile index position minus a top tile column fraction index position times a preceding position of the top left patch frame tile index;
the top left tile row index position is calculated as the top left patch frame tile index position minus a left tile row fraction index position times the preceding position of the top left patch frame tile index;
the bottom right tile column index position is calculated as a bottom right tile index position plus a bottom tile column fraction index position times a bottom right tile index position; and
the bottom right tile row index position is calculated as the bottom right tile index position plus a right tile row fraction index position times the bottom right tile index position.

16. The apparatus of claim 9, wherein a plurality of patch frames has been partitioned into the two or more groups, each patch frame representing a part of content of a scene of the three-dimensional data, wherein the partitioning of the plurality of patch frames into two or more groups is performed during point cloud compression or inherited from an outside resource.

17. A method comprising:
receiving a video presentation frame, wherein the video presentation frame represents three-dimensional data;
dividing the video presentation frame into a plurality of tiles, wherein one or more of the plurality of tiles may be a fractional tile, as part of a process of encoding the video presentation frame, wherein each tile represents a part of the three-dimensional data of the video presentation frame;
grouping the tiles into two or more groups, wherein individual tiles of the video presentation frame have a capability of not belonging to any of the two or more groups;

wherein a first one of the tiles comprises a first fractional part that belongs to a first group of the groups, and wherein the first one of the tiles comprises a second fractional part that belongs to a second group of the groups, the second group being different from the first group;

signaling a flag indicating fractional tiling, and transmitting a signal of fractional tiling related syntax or semantics; and providing an encoded video presentation frame to a decoder, the encoded video presentation frame comprising the grouping of the tiles.

18. A method comprising:

receiving an encoded video presentation frame, wherein the video presentation frame represents three-dimensional data;

wherein the video presentation frame has been divided into a plurality of tiles, wherein one or more of the plurality of tiles may be a fractional tile, wherein each tile represents a part of the three-dimensional data of the video presentation frame;

wherein the tiles have been grouped into two or more groups, wherein individual tiles of the video presentation frame have a capability of not belonging to any of the two or more groups;

wherein a first one of the tiles comprises a first fractional part that belongs to a first group of the groups, and wherein the first one of the tiles comprises a second fractional part that belongs to a second group of the groups, the second group being different from the first group;

receiving a flag indicating fractional tiling, and receiving a signal of fractional tiling related syntax or semantics; and providing a decoded video presentation frame, the decoded video presentation frame comprising a reconstruction of the plurality of tiles.

19. The apparatus of claim 1, wherein a shared portion of the first fractional part that belongs to the first group also belongs to the second group, and the second fractional part comprises the shared portion of the first fractional part, such that the first fractional part and the second fractional part overlap with the shared portion.

20. The apparatus of claim 9, wherein a shared portion of the first fractional part that belongs to the first group also belongs to the second group, and the second fractional part comprises the shared portion of the first fractional part, such that the first fractional part and the second fractional part overlap with the shared portion.

* * * * *